Oct. 21, 1969     H. J. DUURKOOP     3,474,273
ALTERNATING-CURRENT MOTOR HAVING ELECTROMAGNETIC
BRAKING ARRANGEMENT
Filed March 15, 1967     2 Sheets-Sheet 1

INVENTOR.
HENDRIK JAN DUURKOOP
BY
*Robert Ames Noble*
ATTORNEY

INVENTOR.
HENDRIK JAN DUURKOOP

BY

ATTORNEY

United States Patent Office 3,474,273
Patented Oct. 21, 1969

3,474,273
ALTERNATING-CURRENT MOTOR HAVING ELECTROMAGNETIC BRAKING ARRANGEMENT
Hendrik Jan Duurkoop, Vollenhove, Netherlands, assignor to Machinefabriek en Technische Handelsonderneming M. H. van der Graaf N.V., Vollenhove, Netherlands, a corporation of the Netherlands
Filed Mar. 15, 1967, Ser. No. 623,274
Claims priority, application Netherlands, Mar. 16, 1966, 6603421
Int. Cl. H02k 7/10
U.S. Cl. 310—77                     4 Claims

ABSTRACT OF THE DISCLOSURE

An alternating current motor having an electromagnetic brake, in which the magnetic circuit is designed with a minimum dimension of magnetic circuit gap to minimize loss in magnetic energy. At least one annular, spring biased, armature plate cooperates with the tooth-like guide elements for transmitting the magnetic brake flux to the peripheral zone of said plate.

---

This invention relates to an alternating-current motor having an electromagnetic brake device in which at least one annular armature plate carrying the magnetic flux into the magnetic brake circuit is axially spring-biased towards a brake actuating position under axial guidance and peripheral arrestment by guide elements at its outer peripheral zone, said annular armature plate having at its inner periphery a collar extending axially towards a subsequent member which also carries the magnetic brake flux.

Motors of this kind have the disadvantage that the braking torque to be produced by the brake is limited owing to the limitation of the current load of the brake coil, which remains energized while the motor is in operation. It is an object of the invention to improve this brake device so that at a given possible electric load of the brake coil, a maximum power for releasing the brake will become available.

The present invention accordingly provides an alternating-current motor having an electromagnetic brake device in which at least one annular armature plate carrying the magnetic flux into the magnetic brake circuit is axially spring-biased towards a brake energizing position under axial guidance and peripheral arrestment by guide elements at its outer peripheral zone, said annular plate having at its inner periphery a collar extending axially towards a cooperating member which also carries the magnetic brake flux, characterized in that said guide elements also carry the magnetic brake flux and transmit it to the peripheral zone of the annular armature plate.

Said guide elements are preferably constituted by teeth cooperating with teeth provided at the periphery of the armature plate, and advantageously there are provided two axially movable armature plates, disposed with their inner peripheral collars extending towards each other and together defining a U-section accommodating the brake magnet coil. There is thus obtained a magnetic circuit in which the iron route need only once be interrupted by an air gap, and this at a favourable point in the magnetic circuit. In addition, the cross-sectional area of the air gap is relatively small, resulting in a high magnetic induction in the gap and a maximum conversion of the energy to be generated by the available ampere windings into mechanical energy. The construction further has the merit of being compact and simple.

One embodiment of the invention, together with the connection of the brake coil in the motor circuit, will be described, by way of example, with reference to the accompanying drawings, in which FIG. 1 is a sectional view of a brake device according to the invention, applied to an otherwise conventional alternating-current motor;

Figure 1:
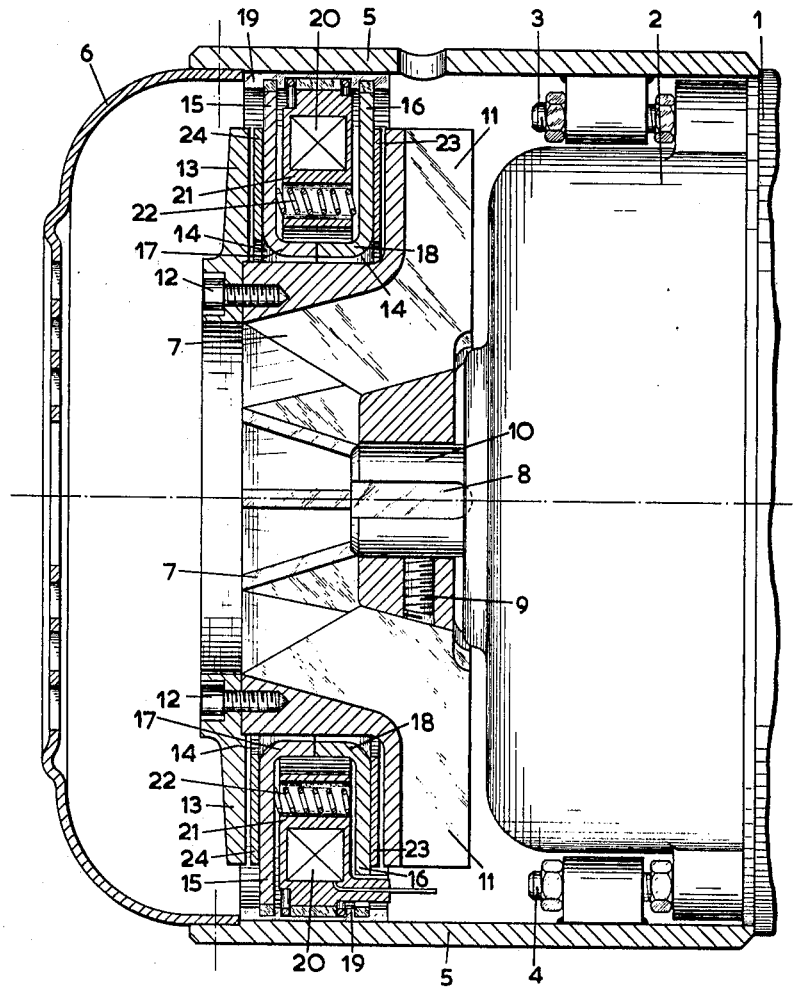

Referring to FIG. 1, the motor housing 1 is extended beyond the end bell 2 by a cylindrical sleeve 5, which is coaxially secured to the motor housing by means of draw bolts 3 and 4, and at the end away from the housing is covered with a cover 6 provided with vent openings. Mounted for rotation within the cylindrical sleeve is a fan 7, fixedly secured to the end of the motor shaft 10 projecting from the end bell 2, by means of a key and a key groove 8 and a screw 9. At the side away from the blades 11, the fan is so shaped as to define a peripheral groove, U-shaped in section, together with a plate 13, to which it is secured by means of screws 12. The smoothly machined upstanding inner walls of the groove 14 constitute braking surfaces.

Extending radially into the peripheral groove of the fan are two annular brake plates 15 and 16, respectively formed with collars 17 and 18 at their inner periphery, extending at right angles to the plane of the plates, and having teeth at their outer periphery to cooperate with an internal ring of teeth 19 provided along an axial portion of the inner surface of the cylindrical sleeve 5.

The brake plates 15 and 16 are thus movable in an axial direction relative to the cylindrical sleeve, but restrained from rotation in the sleeve. The brake plates are disposed with their collars extending towards each other and conduct a magnetic circuit which can be energized by a coil 20, housed in an annular body of insulating material 21. Uniformly spaced about the periphery of the annular body are openings accommodating compression springs 22, which urge the brake plates 15 and 16 apart and with the brake linings 23 and 24 against the braking surfaces of the peripheral groove 14, so that the brake is operative so long as the coil 20 is not energized.

When the coil 20 is energized the magnetic attraction between the teeth of the brake plates 15, 16 and the teeth 19 will immediately remove any play between the teeth which there may be to permit the axial movement, by a slight rotation of the plates 15, 16, so that there is only an air gap between the opposing end faces of the collars 17 and 18 which, given the fact that the length of stroke of the plates 17, 18 requires an air gap anyway, causes the magnetic resistance to be of minimum value. Since further the surface area of the opposing end faces of the collars 17, 18 is relatively small, there will be a maximum force of attraction between the rings 15, 17 and 16, 18 in their initial relative positions at the permissible number of ampere windings.

Figure 2:
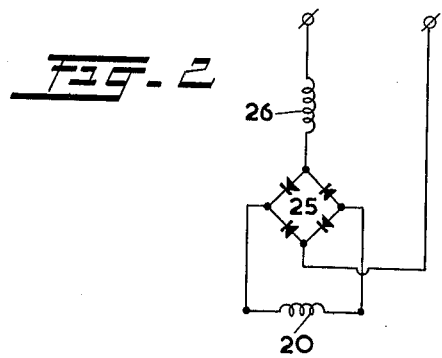
FIG. 2 is a diagram showing the circuitry of the energizing coil of the electromagnetic brake device, series-connected to the main winding of a single-phase alternating-current motor through bridge-circuited rectifier elements.

In the circuit shown in FIG. 2, the coil 20 of the brake device is energized by the current carried by the main winding 26 of the alternating-current motor through a bridge circuit 25 of four rectifier elements.

When the motor is switched on the initial current surge through the main winding can be six to seven times the current during normal operation. This initial current surge is strong enough for the coil, which is series-connected with the main current winding of the motor, to be so energized that the brake plates are pulled towards each other and disengaged from the braking surfaces against the action of the springs 22. Once this has been effected the air gap between the edges 17 and 18 is very small or may be entirely closed and the rentention current is low too, because the motor has meanwhile started and the current through the motor winding 26 has dropped to a nominal value.

Under no-load conditions of the motor the current through the main winding drops to a small value, but yet the energizing or rentention current will be strong enough to keep the magnetic circuit closed through the very small air gap.

The result of the features according to the invention is that the power of the compression springs may be greater than in known brake motors, or that the energizing coil may be small and requires little space. If so desired, the air gap may be rather large so that readjustment to compensate for wear is reduced to a minimum, if not rendered entirely superfluous.

Figure 3:
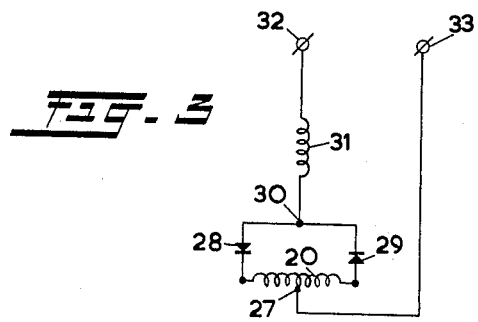
FIG. 3 is a diagram showing the circuitry of the energizing coil provided with a centre tap.

FIG. 3 shows an alternative circuit, which requires only two rectifier elements. In it, the energizing winding 20 of the brake device is provided with a centre tap 27 and is bridged by two series-connected rectifier elements 28, 29.

The junction 30 between the series-connected rectifier elements is connected with one end of the main winding 31 of the motor, the other end of which is connected with a terminal 32 of the motor to the mains, the centre tap 27 being connected with the other terminal 33 of the motor to the mains.

Figure 4:
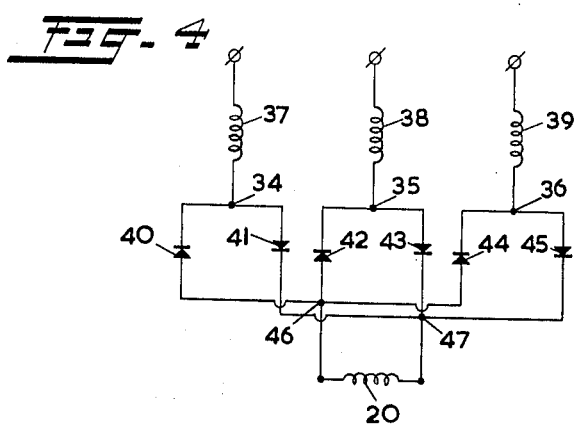
FIG. 4 is a diagram showing the circuitry of the energizing coil in a three-phase alternating-current motor.

FIG. 4 shows a circuit for a multi-phase alternating-current motor, specifically a three-phase motor.

The respective ends 34, 35, 36 of the respective phase windings 37, 38, 39 are in the open star point each connected with the junction between respective pairs of series-connected rectifier elements 40, 41; 42, 43; 44, 45. The distal ends of these six rectifier elements of similar polarity are respectively connected with each other and with an end of the energizing coil 20 in the junctions 46 and 47.

The ripple of the rectified alternating current is in this case only 4%, which reduces noise or any fluttering of the movable parts of the brake device to a minimum.

The circuits shown in FIGS. 3 and 4 produce the same advantages as mentioned in connecting with the circuit of FIG. 2. In a motor having a brake device whose energizing coil is circuited as hown in FIG. 4, the initial current surge after the motor has been switched on is five times the normal current, so that the current of attraction flowing through the energizing coil of the brake device is also five times the current intensity during normal operation, with the consequence that the power of the compression springs may be great, which means that the characteristics of the motor in its function as a brake motor have been improved over and above the prior motors. Since, during normal operation, the rentention current is only about one fifth of the initial current, and under no-load conditions only about one tenth of the initial current or current of attraction, and by virtue of the favourable proportions in the magnetic circuit, the dimensions of the energizing coil may be small so that it takes up little space.

I claim:
1. An alternating-current motor having an electromagnetic brake device in which at least one annular armature plate carrying the magnetic flux into the magnetic brake circuit is axially spring-biased towards a brake actuating position under axial guidance and peripheral arrestment by guide elements at its outer peripheral zone, said annular plate having at its inner periphery a collar extending axially towards a cooperating member which also carries the magnetic brake flux, and wherein said guide elements, in the form of teeth cooperating with teeth provided at the outer periphery of the armature plate, also carry the magnetic brake flux and transmit it to the peripheral zone of the annular armature plate.

2. An alternating-current motor having an electromagnetic brake device comprising a pair of annular armature plates each having an axial collar at its inner periphery, said collars extending towards each other, the armature plates being axially spring-biased towards a brake actuating position under axial guidance and peripheral arrestment by guide elements at their outer peripheral zones, and wherein said guide elements, in the form of teeth cooperating with teeth provided at the outer periphery of the armature plate, also carry the magnetic flux and transmit it to the outer peripheral zones of the armature plates.

3. An alternating-current motor according to claim 2, wherein an annular brake magnet coil is accommodated in the space defined between the armature plates.

4. An alternating-current motor according to claim 3 in which the annular armature plates and their inner periphery collars together define a U-section and the brake magnet coil is positioned therein.

References Cited

UNITED STATES PATENTS

| | | | |
|---|---|---|---|
| 2,514,693 | 7/1950 | Chapman | 310—77 |
| 2,520,204 | 8/1950 | Hancock | 310—77 |
| 2,755,396 | 7/1956 | Lee | 310—77 |
| 3,176,173 | 3/1965 | Straub | 310—77 |

MILTON O. HIRSHFIELD, Primary Examiner

R. SKUDY, Assistant Examiner